United States Patent [19]

Wade

[11] 4,069,099
[45] Jan. 17, 1978

[54] NUCLEAR REACTOR FUEL TRANSFER SYSTEM

[75] Inventor: Elman E. Wade, Ruffs Dale, Pa.

[73] Assignee: Westinghouse Electric Corporation, Pittsburgh, Pa.

[21] Appl. No.: 660,744

[22] Filed: Feb. 23, 1976

[51] Int. Cl.² .................. G21C 19/22; G21C 19/20; B66C 17/08
[52] U.S. Cl. ..................................... 176/31; 176/30; 214/18 N
[58] Field of Search .................... 176/30, 31, 32, 87; 214/17 R, 17 A, 18 N, 103

[56] References Cited

U.S. PATENT DOCUMENTS

| B 373,344 | 2/1976 | Katz ......................................... 176/30 |
| 3,293,136 | 12/1966 | Harris ....................................... 176/30 |
| 3,354,040 | 11/1967 | Frame ....................................... 176/30 |
| 3,862,001 | 1/1975 | Marmonier ............................... 176/30 |
| 3,952,885 | 4/1976 | Schabert .................................. 176/30 |

*Primary Examiner*—Stephen C. Bentley
*Assistant Examiner*—Donald P. Walsh
*Attorney, Agent, or Firm*—L. A. DePaul; Z. L. Dermer

[57] ABSTRACT

A system for transferring fuel assemblies between a nuclear reactor core and a fuel transfer area while the fuel assemblies remain completely submerged in a continuous body of coolant. The system comprises an in-vessel transfer machine and a valve capable of isolating the reactor vessel from the remainder of the fuel transfer system. The in-vessel transfer machine consists of a positioning mechanism and a lifting mechanism. The positioning mechanism is composed of a plurality of rotatable plugs located on the reactor vessel head. The lifting mechanism which is capable of lifting or lowering a chosen fuel assembly is disposed on a tilted plug at an angle relative to the tilted plug's plane of rotation. The rotatable plugs together with the lifting mechanism are capable of transferring a fuel assembly between the fuel transfer area and any core location or between any two core locations while the fuel assembly remains completely submerged in a continuous body of coolant.

12 Claims, 3 Drawing Figures

NUCLEAR REACTOR FUEL TRANSFER SYSTEM

CROSS-REFERENCES TO RELATED APPLICATIONS

The invention herein disclosed is related to copending application Ser. No. 660,746, filed Feb. 23, 1976, entitled Ex-Vessel Nuclear Fuel Transfer System, by E. E. Wade, which is assigned to the present assignee.

BACKGROUND OF THE INVENTION

This invention relates to nuclear reactors and more particularly to a system for transferring fuel assemblies between a nuclear reactor core and a fuel transfer area while the fuel assemblies remain completely submerged in a continuous body of coolant.

During the refueling of sodium cooled fast breeder reactors, it is necessary to remove the decay heat from the irradiated fuel assemblies to prevent their reaching a temperature at which the fuel rod ruptures, because the rupture of the fuel rod results in the release of radioactive gases thus presenting health and contamination problems that are unacceptable. Therefore, it has become accepted practice to provide a means of dissipating the decay heat of an irradiated assembly by providing a system whereby the fuel assembly is kept submerged in a sodium coolant during transfer between the reactor and decay storage.

In most under sodium refueling systems, the means of keeping the fuel assembly submerged in sodium has been to place the fuel assembly in a sodium filled pot, a container with an open end, and then transfer the pot to the desired location. With this type of under sodium refueling system an auxiliary gas or liquid metal cooling system for the pot of sodium is always necessary to meet an emergency condition such as failure of the transfer means. In addition, the ever present possibility of failure of the auxiliary system must be dealt with by providing a backup system. Typically, the cooling capability of the gas system is limited to about 10 KW because of technology limitations. In large commercial fast breeder reactor plants the decay heat from a spent fuel assembly, at the time after reactor shutdown when it is economical to do refueling, is as much as 60 KW or greater. An auxiliary cooling system capable of safely removing that amount of heat, is not presently compatible with the entire reactor plant economics and technology.

In the British Prototype Fast Reactor (PFR) refueling system, the irradiated fuel assembly is stored in a rotor inside the reactor vessel for an initial decay period, and then moved through an opening in the reactor head into a transfer machine located outside of the reactor vessel, an ex-vessel transfer machine. The machine moves above an opening in a transfer tunnel, couples onto a mechanism around the opening, and lowers the fuel assembly through the opening. Equipment within the tunnel moves the fuel assembly laterally in the tunnel to beneath a second opening in the top of the tunnel. A crane mounted machine moves the fuel assembly through a valve on the opening into a fuel handling cell and into further storage prior to partial disassembly for shipping to reprocessing. Aside from the cost problems, there are problems associated with sophisticated interlocks that must be provided to insure against release of fission products during refueling because of the danger to operating personnel. In addition, the valves and adapters associated with coupling the ex-vessel transfer machine to the mechanism around the opening in the reactor head and to the mechanism around the opening in the tunnel are large and expensive. This coupling and uncoupling process is also quite time consuming which increases the refueling time.

The British Commercial Fast Reactor (CFR) refueling system stores the irradiated fuel assembly in a rotor inside the reactor vessel for an initial decay period, then moves it through an opening in the reactor head to a sodium filled compartment and then through an opening in the compartment into a sodium filled compartment outside of containment. The under sodium valves in the openings of the compartments are expensive to install and maintain.

The French Phenix and Phenix 4 refueling systems move the irradiated fuel assembly in a pot through an opening in the reactor head into a gas cooled compartment, then through an opening in the compartment into a decay storage rotor outside of the containment housing the reactor. After a decay period the fuel assembly is moved from the rotor through an opening into a fuel handling cell. In this concept a major safety problem would result if the cooling system of the gas cooled compartment fails and the sodium filled pot containing the fuel assembly becomes stuck in the compartment, as would happen in a power failure. This would result in the fuel assembly overheating and possibly rupturing the fuel rods releasing contaminants.

The Russian liquid metal power reactor refueling systems, in principle, handle the fuel assemblies similarly to the French, and are subject to similar problems.

Other reactor refueling systems have been conceptually designed which keep the fuel submerged in virtually an unlimited amount of sodium. In these concepts the fuel assembly is rotated about a horizontal axis into a horizontal position and then removed from the reactor vessel through an opening in the reactor vessel wall. In this system the sodium level in the ex-vessel transfer machine must be maintained at a higher level than the reactor vessel operating level. Consequently, the loss of this difference in coolant levels could result in loss of cooling to the fuel in transit. Also, the configuration of the horizontal axis machine requires a large lateral dimension significantly increasing the width of the containment building. In addition, the selection of bearings and seals for the horizontal machine is limited because of the constraint that they must operate under sodium.

SUMMARY OF THE INVENTION

A system for transferring fuel assemblies between the reactor core and the fuel transfer area while the fuel assemblies remain completely submerged in a continuous body of coolant.

The system comprises an in-vessel transfer machine and an isolation valve. The in-vessel transfer machine consists of a positioning mechanism and a lifting mechanism. The positioning mechanism which is disposed on the reactor vessel is composed of a plurality of rotatable plugs. One of the rotatable plug's plane of rotation is tilted with respect to the other plug's plane of rotation. The lifting mechanism which is capable of lifting or lowering a chosen fuel assembly is disposed on the tilted plug at an angle relative to the tilted plug's plane of rotation. The tilted plug can be rotated so as to place the lifting mechanism in colinear alignment with a fuel assembly. A selected rotation of the remaining plugs is capable of aligning the lifting mechanism with any fuel assembly in the reactor core. The rotatable plugs together with the lifting mechanism, provide a means of transferring a fuel assembly between the fuel transfer area and any core location or between any two core locations while the fuel assembly remains completely submerged in a continuous body of coolant.

Because the transfer area is located below the reactor coolant level, safety procedure requires that during reactor operation the fuel transfer area be isolated from the reactor vessel. This isolation is accomplished by an isolation valve. A fuel transfer nozzle connects the fuel transfer area to the inside of the reactor vessel. During reactor operation, a plug is held in the fuel transfer nozzle by a plug control means thereby isolating the fuel transfer area from the inside of the reactor vessel.

DESCRIPTION OF THE PREFERRED EMBODIMENT

A nuclear reactor consists of a core containing fuel assemblies that produces heat, a coolant that removes that heat, and a pressure vessel that encloses the core and coolant. The top of the pressure vessel sealing the internals of the reactor from the atmosphere is known as the pressure vessel head. After a period of operation the exhausted fuel assemblies must be replaced with fresh ones. The system described herein accomplishes that refueling while the fuel assemblies remain completely submerged in a continuous body of coolant.

Figure 1:
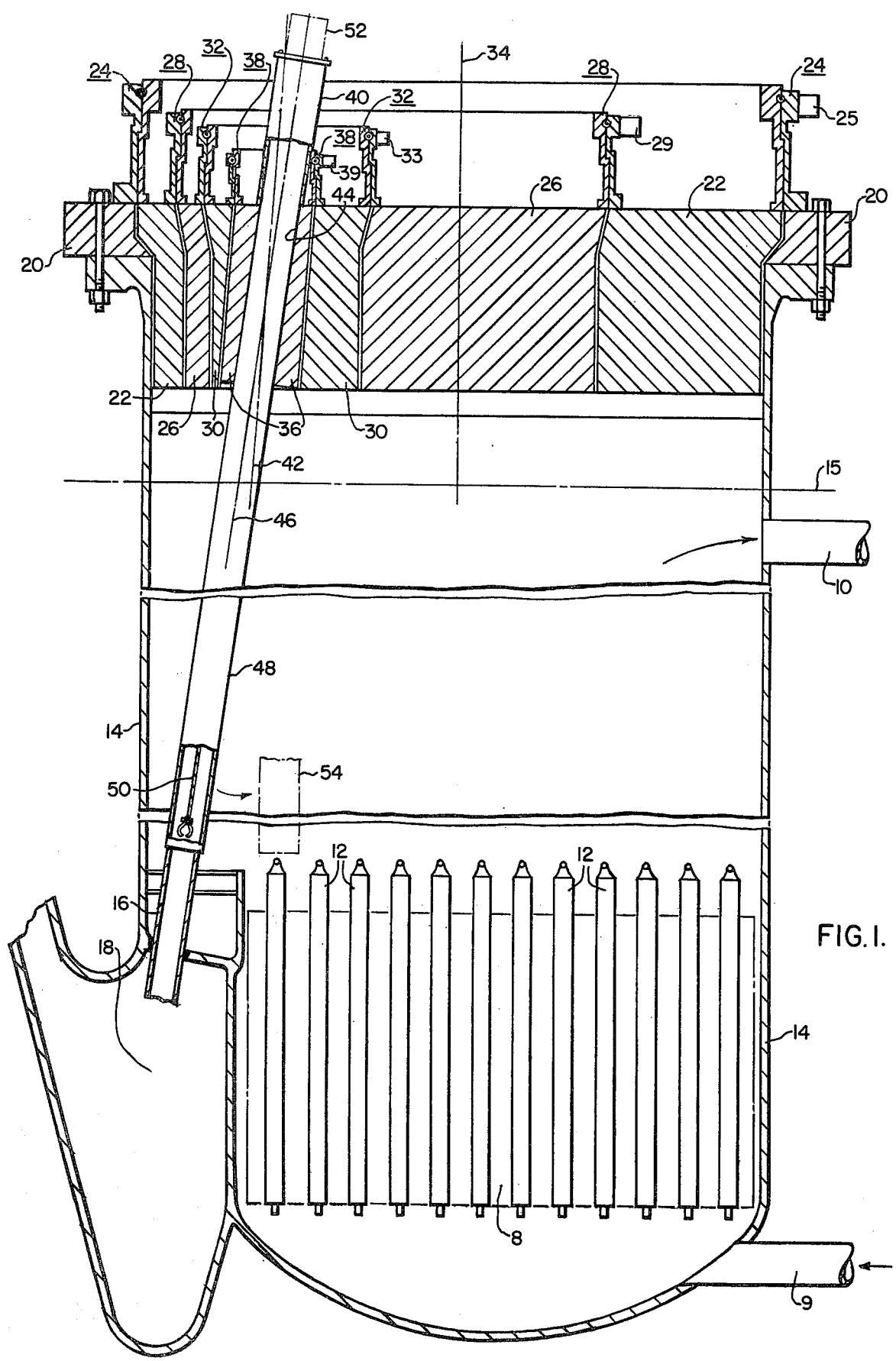
FIG. 1 is a sectional elevation of a nuclear reactor showing the in-vessel transfer machine in colinear alignment with the fuel transfer nozzle.

Referring to FIG. 1, a reactor core 8, having a coolant inlet 9, outlet 10, and fuel assemblies 12, is disposed within the reactor vessel 14 below reactor coolant level 15, all in a manner well known in the art. Disposed on the wall of reactor vessel 14 is fuel transfer nozzle 16 which connects the inside of reactor vessel 14 to the fuel transfer area 18. Disposed on the reactor vessel 14 is a stationary ring 20. Located within stationary ring 20 is a large rotatable plug 22 which rotates relative to stationary ring 20. Disposed on stationary ring 20 and large rotatable plug 22 is a large riser assembly 24. The large riser assembly 24 having bearings, seals, and drive mechanism 25 provides an annulus between large stationary ring 20 and the large rotatable plug 22 which allows the relative rotation of the large rotatable plug 22. Disposed eccentrically to the large rotatable plug 22 is the intermediate rotatable plug 26. Disposed on the intermediate rotatable plug 26 and the large rotatable plug 22 is the intermediate riser assembly 28 having drive mechanism 29 which has a function similar to that of the large riser assembly 24. A small rotatable plug 30 is disposed eccentrically to the intermediate rotatable plug 26. A smaller riser assembly 32 with drive mechanism 33 and being similar to the large riser assembly 24, is disposed on the small rotatable plug 30 and the intermediate rotatable plug 26 which allows the small rotatable plug 30 to rotate relative to the intermediate rotatable plug 26. The large rotatable plug 22 has an axis of rotation 34 through its center. The small rotatable plug 30 and the intermediate rotatable plug 26 although being disposed eccentrically to each other and to the large rotatable plug 22 have axes of rotation parallel to axis of rotation 34. Disposed eccentrically to the small rotatable plug 30 is a tilted rotatable plug 36 having a riser assembly 38 with drive mechanism 39 disposed thereon. Extending from the top of the tilted rotatable plug 36 is a support collar 40. The tilted rotatable plug 36 has an axis of rotation 42 through its center inclined at an angle relative to axis of rotation 34. Bore 44 having a longitudinal axis 46 runs the entire length of both the tilted rotating plug 36 and the support collar 40. The longitudinal axis 46 is inclined relative to the axis of rotation 42 at an angle one-half the total operational angular displacement of bore 44. During reactor refueling, the grapple support structure 48, the grapple 50, and the grapple control mechanism 52 are inserted into bore 44 as a unified assembly.

OPERATION

In operation, the tilted rotatable plug 36 rotates until axis 46 is parallel to axis of rotation 34. At this point the grapple support structure 48 is in colinear alignment with a fuel assembly; position 54 being a typical example. Selected combined rotations of large rotatable plug 22, intermediate rotatable plug 26, and small rotatable plug 30 will place the grapple support structures 48 above any fuel assemblies selected to be removed. The grapple 50 then lowers to the top of the fuel assembly and attaches thereto. Grapple 50 next lifts the fuel assembly into the grapple support structure 48. The combined rotation of the three planar plugs places the grapple support structure 48 in an outboard position, such as position 54, from where a 180° turn of the tilted rotatable plug 36 places the grapple support structure 48 in colinear alignment nearly abutting fuel transfer nozzle 16. The grapple 50 then lowers the fuel assembly through the fuel transfer nozzle 16 and into the fuel transfer area 18. In order to place a new fuel assembly in the core the above process is repeated in reverse order. When the refueling process is completed the grapple 50, the grapple support structure 48, and the grapple control mechanism 52 may be removed and replaced by a suitable means to close the fuel transfer nozzle 16. It should be noted that depending on the design of the reactor any number of rotatable plugs together with a tilted plug and lifting means may be used.

In addition to facilitating under sodium transfer, the in-vessel transfer machine allows for use of a smaller reactor vessel due to the unique angular displacement of the grapple support structure. Reliability is also improved by the elimination of angle drives and off-set arms of the prior art. The fuel being constantly under a continuous body of coolant is always in a good position for convective cooling eliminating the need for auxiliary cooling systems of the prior art. Further, the fuel never comes above the operating floor of the reactor thereby eliminating the possibility of sodium spills during refueling and eliminating the need for a refueling hot cell.

The tilted rotatable plug and grapple support structure rotate about an essentially vertical axis which does not require a large lateral dimension as do the horizontal axis machines of the prior art. Moreover, all bearings and seals are located above the sodium level where the sodium cannot affect their operation, and since the fuel transfer area is well below the reactor coolant operating level there is no need to maintain a higher coolant level during refueling than during operation as the prior art requires.

It is anticipated that the rotatable plug controls and drives, grapple, grapple plug control mechanism, bearings, seals, and electrical systems can be chosen from those well known in the art.

Figure 2:
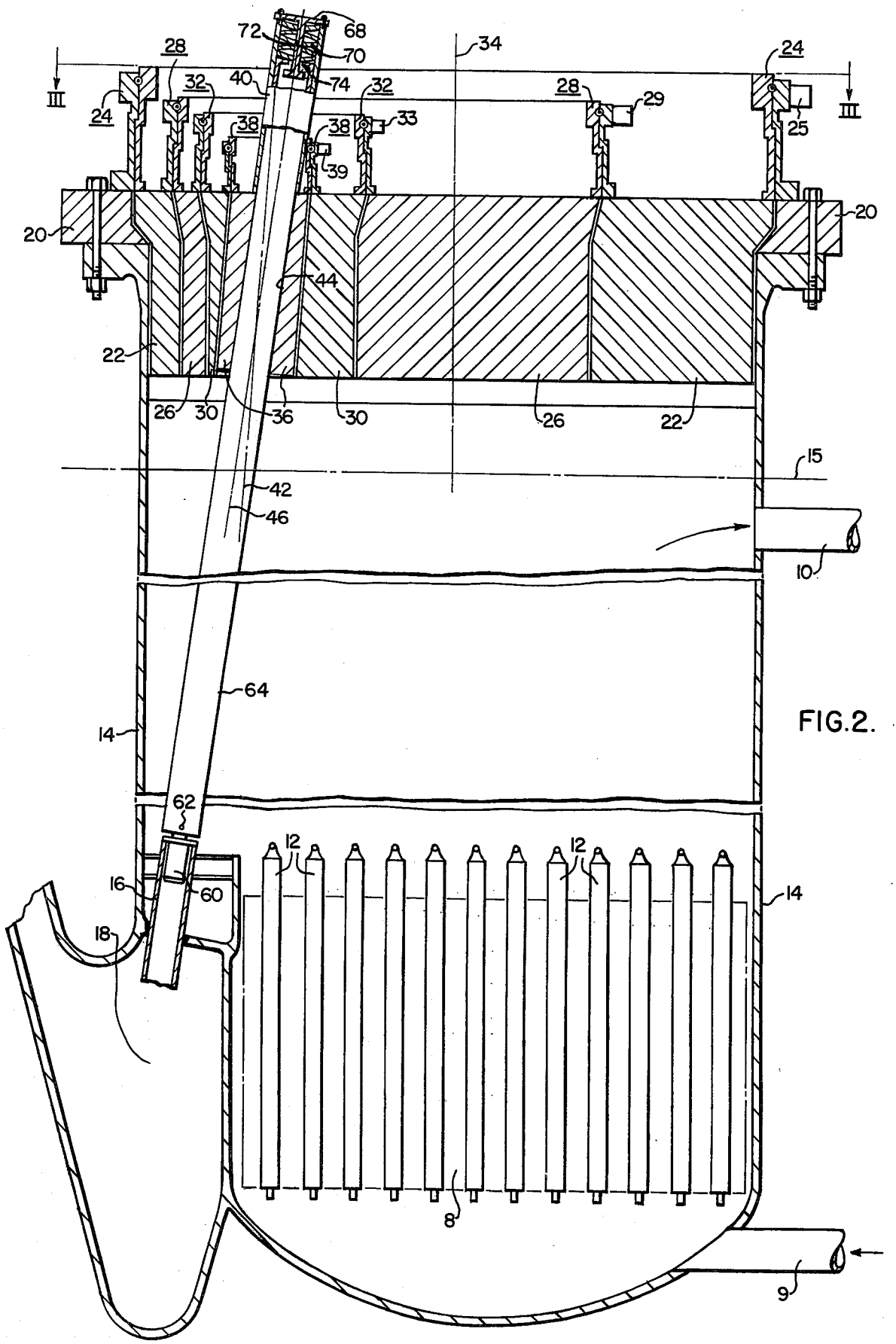
FIG. 2 is a sectional elevation of a nuclear reactor showing the isolation valve in its isolating position.
Figure 3:
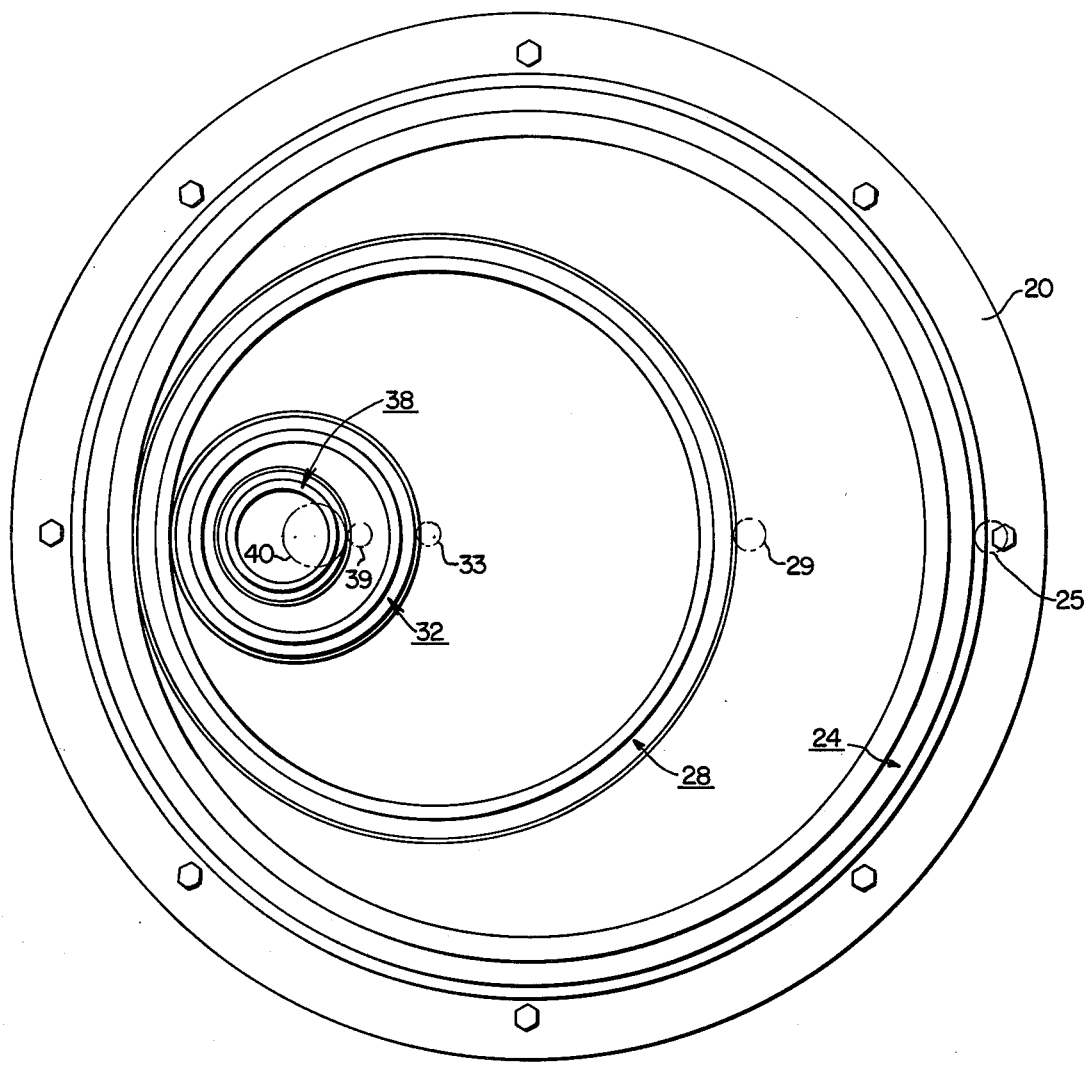
FIG. 3 is a plan view of the head of a nuclear reactor showing the rotatable plugs.

Referring to the valving arrangement used for isolating the reactor from the fuel transfer area during normal reactor operation, as shown in FIG. 2, the isolation valve consists of a fuel transfer nozzle 16, a plug 60, a plug pivot pin 62, a plug holddown column 64, a sealing flange 68, plug loading springs 70, and a spring holder 72.

The fuel transfer nozzle 16 is disposed on the reactor vessel 14. Plug 60 is attached to the plug pivot pin 62 which is attached to the plug holddown column 64. The plug holddown column 64 extends from within the support collar 40 and the tilted rotatable plug 36 down to the plug pivot pin 62. Sealing flange 68 is attached to the top of support collar 40. Attached to the sealing flange is the spring holder 72. Plug loading springs 70 disposed on spring holder 72 are compressed between sealing flange 68 and the top of the plug holddown column 64.

During reactor operation, the plug 60, plug pivot pin 62, plug holddown column 64, sealing flange 68, spring holders 72 and plug loading springs 70 are inserted into support column 40 and tilted rotatable plug 36 as a unified assembly. When in this position plug 60 fits into the fuel transfer nozzle 16 thereby isolating the reactor vessel from the remainder of the transfer system. Plug loading springs provide a force to hold plug 60 in fuel transfer nozzle 16 under coolant flow variations. Further, a clearance 74 is provided between the top of plug holddown column 64 and spring holder 72 so that under temperature variations contraction of plug holddown column 64 will not pull plug 60 out of fuel transfer nozzle 16. In the event of an emergency seismic condition, the plug pivot pin 62 will separate from the plug 60 leaving plug 60 securely in the fuel transfer nozzle 16 and preventing loss of reactor coolant through the fuel transfer nozzle 16. This isolation prevents disruptions on one side of plug 60 from affecting the other side. During refueling the unified valve assembly is removed by unbolting and lifting sealing flange 68.

Difficulties in the prior art of under sodium refueling concerned the reliability of the under sodium valves. The unreliability of the prior art was due mainly to its complex valves, seals, and control mechanisms and their inaccessibility to repair. The value of the present valve lies largely in its simplicity and resultant reliability. The ease of removal and safety features coupled with its basic simplicity assure dependable operation.

The inter-relation of the isolation valve and the in-vessel transfer machine is evident. During refueling, the in-vessel transfer machine provides a means for transferring a fuel assembly between the core and the fuel transfer area while the fuel assembly remains completely submerged in a continuous body of coolant. However, in order to make the in-vessel transfer machine a safely operable mechanism, a means must be provided for isolating the fuel transfer area from the core during reactor operation. This isolation means is, of course, provided by the isolation valve which conveniently fits in the bore of the tilted rotatable plug when the in-vessel lifting mechanism is removed.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention.

We claim:

1. A nuclear reactor fuel transfer system including a reactor vessel having a head thereon, fuel assemblies positioned therein, and an inlet and an outlet for circulating a coolant through said fuel assemblies comprising:

a fuel transfer area located outside said reactor vessel and below the reactor operating coolant level, said fuel transfer area being directly connected to said reactor vessel below said reactor operating coolant level for accommodating the transfer of fuel assemblies;

valve means disposed on said head of said reactor vessel and on a wall of said reactor vessel adjacent to said fuel transfer area at an angle relative to the horizontal for selectively isolating said fuel transfer area from said reactor vessel; and in-vessel transferring means supported by said head of said reactor vessel at an angle to the horizontal corresponding to the inclination of said valve means for transferring said fuel assemblies between said reactor vessel and said fuel transfer area while said fuel assemblies remain at an angle to the horizontal and while said fuel assemblies remain completely submerged in a continuous body of reactor coolant.

2. The system recited in claim 1 wherein said valve means comprises:

a fuel transfer nozzle disposed on a wall of said reactor vessel below said reactor operating coolant level at an angle to the horizontal corresponding to the inclination of said in-vessel transferring means for connecting the inside of said reactor vessel to said fuel transfer area; isolation means coupled with said fuel transfer nozzle for selectively isolating said inside of said reactor vessel from said fuel transfer area; and control means for manipulating said isolation means.

3. The system recited in claim 2 wherein said isolation means comprises:

a plug compatible with said fuel transfer nozzle capable of isolating said inside of said reactor vessel from said fuel transfer area.

4. The system recited in claim 3 wherein said control means comprises:

a plug pivot pin attached to said plug capable of separating from said plug allowing said plug to remain in said fuel transfer nozzle;

a plug holddown column attached to said plug for manipulating said plug;

a sealing flange attached to the head of said reactor vessel;

plug loading springs compressed between said sealing flange and said plug holddown column applying a force upon said plug holddown column, said plug holddown column transmitting said force through said plug pivot pin onto said plug holding said plug in said fuel transfer nozzle; and a spring holder disposed on said sealing flange holding said plug loading springs and providing a clearance between itself and said plug holddown column, said clearance allowing contraction of said plug holddown column without lifting said plug out of said fuel transfer nozzle, said spring holder providing a unified assembly.

5. The system recited in claim 1 wherein said in-vessel transferring means comprises:
   positioning means having an axis of rotation therethrough disposed on said head of said reactor vessel.

6. The system recited in claim 5 wherein said in-vessel transferring means further comprises:
   lifting means disposed on said positioning means inclined at an angle relative to said axis of rotation of said positioning means.

7. The system recited in claim 6 wherein said positioning means comprises:
   a rotatable plug having an axis of rotation therethrough disposed on the head of said reactor vessel; and
   a tilted rotatable plug having an axis of rotation therethrough disposed on said rotatable plug, said axis of rotation of said tilted rotatable plug being inclined at an angle relative to said axis of said rotatable plug, said tilted rotatable plug having said lifting means disposed thereon at an angle relative to said axis of said tilted rotatable plug.

8. The system recited in claim 6 wherein said lifting means comprises:
   a grapple support structure capable of supporting said fuel assemblies; and
   a grapple associated with said grapple support structure capable of manipulating said fuel assemblies.

9. A nuclear reactor system capable of isolating a fuel transfer area located outside a reactor vessel from said reactor vessel comprising:
   a fuel transfer nozzle disposed on a wall of said reactor vessel below the reactor operating coolant level at an angle to the horizontal for connecting the inside of said reactor vessel to said fuel transfer area;
   isolation means coupled with said fuel transfer nozzle for selectively isolating said inside of said reactor vessel from said fuel transfer area; and
   control means for manipulating said isolation means.

10. The system recited in claim 9 wherein said isolation means comprises:
    a plug compatible with said fuel transfer nozzle capable of isolating said inside of said reactor vessel from said fuel transfer area.

11. The system recited in claim 10 wherein said plug control means comprises:
    a plug pivot pin attached to said plug capable of separating from said plug allowing said plug to remain in said fuel transfer nozzle;
    a plug holddown column attached to said plug for manipulating said plug;
    a sealing flange attached to the head of said reactor vessel;
    plug loading springs compressed between said sealing flange and said plug holddown column applying a force upon said plug holddown column, said plug holddown column transmitting said force through said plug pivot pin onto said plug holding said plug in said fuel transfer nozzle; and
    a spring holder disposed on said sealing flange holding said plug loading springs and providing a clearance between itself and said plug holddown column, said clearance allowing contraction of said plug holddown column without lifting said plug out of said fuel transfer nozzle, said spring holder providing a unified assembly.

12. A nuclear reactor in-vessel transfer apparatus disposed on the head of a reactor vessel for transferring fuel assemblies between the core of said reactor vessel and a fuel transfer area located outside said reactor vessel and connected to said reactor vessel below the reactor operating coolant level while said fuel assemblies remain inclined at an angle to the horizontal and while said fuel assemblies remain completely submerged in a continuous body of reactor coolant comprising:
    a fuel transfer nozzle disposed on a wall of said reactor vessel at an angle to the horizontal and below said reactor operating coolant level for accommodating the transfer of said fuel assemblies between said reactor vessel and said fuel transfer area;
    a rotatable plug disposed on the head of said reactor vessel and having a substantially vertical first axis of rotation for transporting said fuel assemblies between various locations within said reactor vessel;
    a tilted rotatable plug disposed on said rotatable plug and having a second axis of rotation inclined relative to said first axis for transporting said fuel assemblies between a substantially vertical position and a position in colinear alignment with said fuel transfer nozzle;
    a grapple support structure disposed on said tilted rotatable plug at an angle relative to said second axis for supporting said fuel assemblies during transfer; and
    a grapple associated with said grapple support structure for lifting or lowering said fuel assemblies.

* * * * *